United States Patent [19]

Bertram et al.

[11] Patent Number: 5,012,147

[45] Date of Patent: Apr. 30, 1991

[54] DOMESTIC VIBRATION APPARATUS WITH LEVER DRIVE

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corporation, New York, N.Y.

[21] Appl. No.: 373,367

[22] Filed: Jun. 28, 1989

[30] Foreign Application Priority Data

Jul. 1, 1988 [DE] Fed. Rep. of Germany ....... 3822332

[51] Int. Cl.[5] ........................ B20B 19/02; F16D 3/00; F16F 15/12

[52] U.S. Cl. .................................... 310/80; 30/43.92; 74/42; 310/47

[58] Field of Search .................. 30/43.9, 43.92; 74/42, 74/43, 47, 54; 310/47, 50, 80

[56] References Cited

U.S. PATENT DOCUMENTS

| | | | |
|---|---|---|---|
| 3,244,916 | 4/1966 | Jepson | 310/80 |
| 4,019,252 | 4/1977 | Port et al. | 30/43.92 |
| 4,760,297 | 7/1988 | Schemmann | 310/47 |
| 4,791,327 | 12/1988 | Bertram et al. | 310/47 |

*Primary Examiner*—Steven L. Stephan
*Assistant Examiner*—D. L. Rebsch
*Attorney, Agent, or Firm*—Bernard Tiegerman

[57] ABSTRACT

A domestic vibration apparatus, in particular a dry-shaver or hair trimmer, in which rotary movements of a two-pole permanent magnet (9) forming a rotor are converted into vibratory movements of a vibration tool by means of a lever system (13) which preloads the drive in such a way that the rotor (9) can oscillate about a rest position,t he two-pole permanent-magnet rotor (9) without pole-pieces being arranged in the U-shaped stator of a single-phase synchronous motor.

40 Claims, 12 Drawing Sheets

DOMESTIC VIBRATION APPARATUS WITH LEVER DRIVE

Figure 1A:
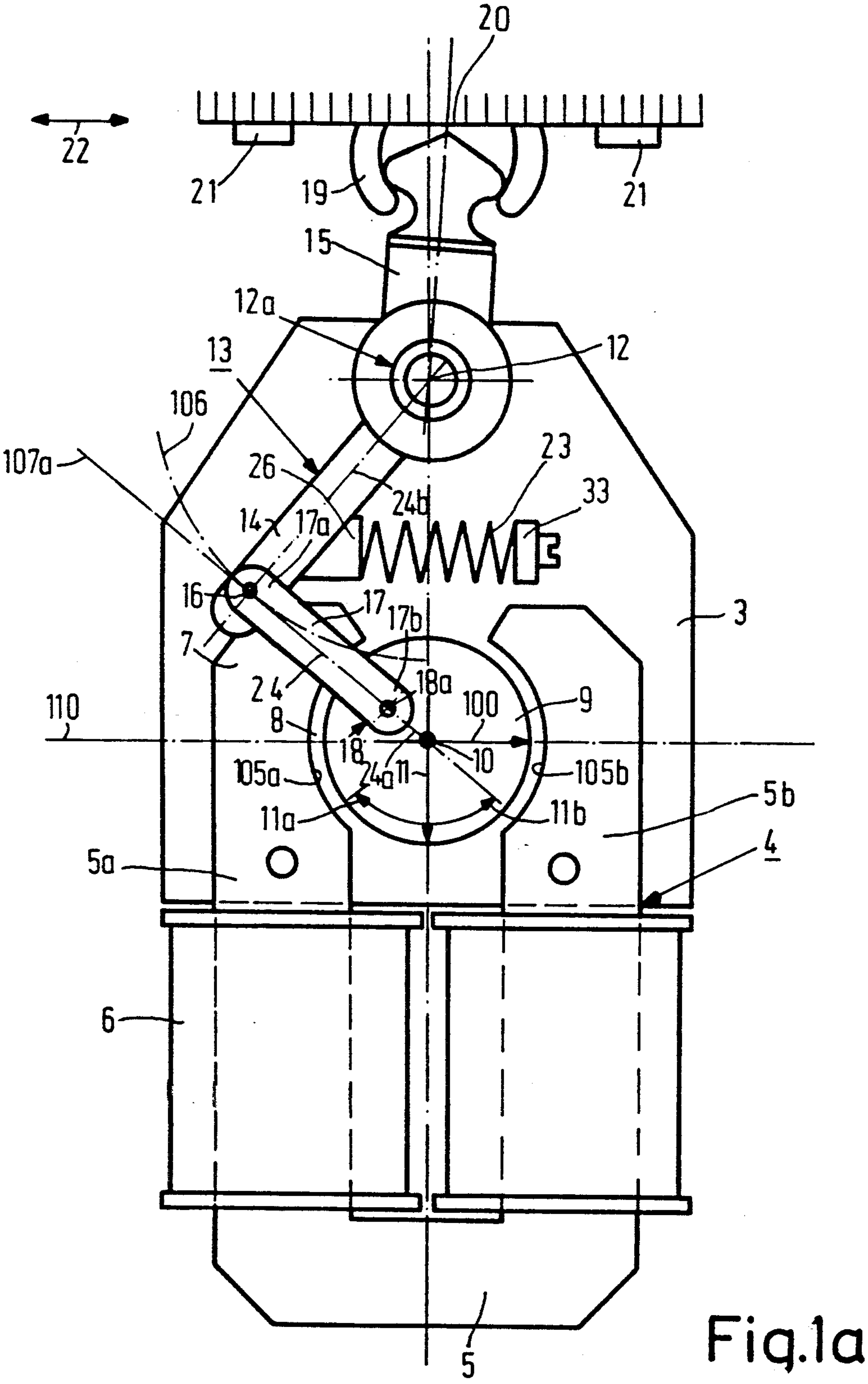

The invention relates to a domestic vibration apparatus, in particular a dry-shaver or hair trimmer, in which movements of a two-pole permanent magnet forming a motor in a stator arrangement energized by means of coils produce a vibratory movement of a vibration tool, in particular via a lever system coupled to the movements of the rotor, a return spring-force acting on the lever system to pre-load the drive system comprising the lever system and the rotor in such a way that the rotor can oscillate about a rest position, the lever system comprising a two-arm swing lever and being connected to an eccentrically disposed pin of the rotor.

Such a domestic vibration apparatus in the form of a dry-shaver or hair trimmer is known from No. DE-PS 34 04 297. Said apparatus employs a single-phase synchronous motor having a two-pole permanent-magnet motor. The use of a single-phase synchronous motor in conjunction with a vibration tool requires special dimensioning and constructional steps in order to ensure a reliable starting and a stable movement. The conversion of the rotation of the rotor into a reciprocating tool movement of twice the frequency, said tool being a cutter, is effected by means of a cam-and-roller mechanism. The cam-and-roller mechanism cooperates with a spring which acts as a starting aid and also ensures that the roller is not lifted off the cam. The advantage of such a drive system resides in the small space it requires. A single-phase synchronous motor is smaller than a vibrating-armature motor of the same power rating. However, the steps which guarantee a correct starting and stable operation require that the conversion mechanism and the motor design should meet specific narrow tolerances. Moreover, the cam-and-roller mechanism exhibits substantial mechanical conversion losses at the cam-and-roller contact surfaces.

U.S. Pat. No. 3,333,172 describes a time-measurement device comprising a balance spring of a clock. The spiral balance spring limits the rotor movements; in principle, it vibrates with a frequency which depends on the mass and spring construction of the system. The coils are driven electronically. The motor is constructed as a single-phase synchronous motor; however, it is not intended or suitable for driving a high-power appliance. The air gap is symmetrical about the central axis through the stator bore parallel to the stator field direction.

From No. DE-OS 20 32 520 a vibrating-armature motor is known which serves for driving a hair trimmer and which comprises an a.c. energized magnet system, whose armature, which is set into vibration by the six alternating poles, comprises a permanent magnet which together with its pole pieces vibrates about its central axis. An armature having pole pieces is intricate and has a large vibration mass. The stator described therein is also of an intricate construction. The armature carries an eccentric pin which engages a two-arm lever connected to a movable cutter. As in the central position of the lever the connecting line between the armature shaft and the swing lever extends through the eccentric pin, the vibration frequencies of the armature and the movable cutter are equal. For the envisaged operation on a 50 Hz mains the vibration frequency is 50 Hz.

It is an object of the invention to provide a domestic vibration apparatus of the type defined in the opening paragraph, which is suitably driven by a motor of the single-phase synchronous type but which does not require any steps to improve its starting performance and dynamic characteristics and which has low mechanical conversion losses.

According to the invention this object is achieved by several embodiments. A first embodiment is characterized in that the two-pole permanent magnet rotor without pole-pieces is arranged in the U-shaped stator of a single-phase synchronous motor, a first lever arm of the two-arm swing lever and the rotor are interconnected by a connecting rod which at one end is articulated to the first lever arm by means of a connecting-rod joint and at its other end is eccentrically articulated to the rotor by means of the crank pin, the spring force pre-loads the drive system in such a way that when the stator coils are not energized the rest position of the rotor coincides with the position in which the average direction of magnetization of the rotor is oriented substantially perpendicularly to the average magnet-field direction of the stator arrangement, in the rest position of the rotor the extension of the connecting line between the connecting-rod joint and the crank pin extends through the rotor shaft, so that the mechanical vibration frequency of the swing lever is doubled relative to that of the rotor.

A second embodiment is characterized in that the two-pole permanent-magnet rotor without pole-pieces is arranged in the U-shaped stator of a single-phase synchronous motor, the first lever arm is constructed as a slot-type converter having a longitudinal slot in which an eccentric pin of the rotor engages, in the rest position of the rotor the connecting line between the eccentric pin and the rotor shaft and the connecting line between the rotor shaft and the swing-lever fulcrum form a right angle, the spring force pre-loads the drive system in such a way that when the stator coil are not energized, the rest position of the permanent magnet forming the rotor, coincides with the position in which the average direction of magnetization of the rotor is oriented substantially perpendicularly to the average magnet-field direction of the stator arrangement, so that the mechanical vibration frequency of the swing lever is doubled relative to the vibration frequency of the rotor.

A third embodiment is characterized in that the two-pole permanent-magnet rotor without pole-pieces is arranged in the U-shaped stator of a single-phase synchronous motor, the first lever arm of the two-arm swing lever and the permanent magnet rotor are connected by a connecting rod which at one end is articulated to the first lever arm by means of a connecting-rod joint and at its other end is articulated eccentrically to the rotor by means of the crank pin, the spring force pre-loads the drive system in such a way that when the stator coils are not energized the rest position of the rotor coincides with the position in which the average direction of magnetization of the rotor is oriented substantially perpendicularly to the average magnet-field direction of the stator arrangement, in the rest position of the rotor the connecting line between the connection-rod joint and the crank pin and the connecting line between the crank pin and the axis of the rotor shaft form an angle of substantially 90° with each other, in said position the tangent line to the path of movement of the connecting-rod joint extends substantially through the crank pin, the rest position of the rotor is established by spring means arranged at opposite sides of the first lever arm and acting on abutments on the mounting plate, so that the vibration frequency of the swing lever and of the rotor are the same, the desired vibration frequency of the swing lever is dictated by the electrical drive of the coils.

A fourth embodiment is characterized in that the two-pole permanent-magnet rotor without pole-pieces is arranged in the U-shaped stator of a single-phase synchronous motor, the first lever arm is constructed as a slot-type converter having a longitudinal slot in which an eccentric pin of the rotor engages, in the rest position of the rotor the connecting line between the axis of the rotor shaft and the swing-lever fulcrum extends through the eccentric pin, the spring force pre-loads the drive system in such a way that when the stator coils are not energized the rest position of the rotor coincides with the position in which the average direction of magnetization of the rotor is oriented substantially perpendicularly to the average magnet-field direction of the stator arrangement, so that the mechanical vibration frequency of the swing lever is equal to that of the rotor, the desired vibration frequency of the swing lever is dictated by the electrical drive of the coils.

The drive system of such a domestic vibration apparatus exhibits a satisfactory efficiency because there are no mechanical losses between contact surfaces as in the case of a cam-and-roller mechanism, so that it is also very suitable for battery operation. Moreover, it is possible to utilize the well-known and advantageous single-phase synchronous motor, which can be manufactured economically and which is of very flat construction. Starting problems are reduced because the parallel orientation of the rotor field and the stator field can no longer occur and the dynamic characteristics present no problems. The drive system produces a pleasant running noise. The simple construction of the vibration drive is obtained by means of customary constructional elements.

In a modification of the first embodiment of the invention characterized in that in addition the tangent line to the circular arc of movement described by the connecting-rod joint about the swing-lever fulcrum during the vibratory movement extends through the rotor shaft.

In this way it is achieved that a dead center position of the tool coincides with the rotor rest-position about which the rotor vibrates. In the present case the vibratory movement of the lever arm has a frequency equal to twice the fundamental frequency of the rotor vibration, which fundamental frequency is equal to the frequency of the applied voltage. This is particularly advantageous in vibration dry-shavers, in which a vibration frequency of 100 Hz or 120 Hz is customary.

Starting from the dead center position the amplitude of the vibratory movement of the tool and hence its mid position depend on the vibratory movement of the rotor, which is dictated by all the system parameters such as voltage, friction, spring characteristics etc. Consequently, the mid position varies with the operating data. Moreover, when the first dead-centre position is fixed the second dead-centre position of the tool will depend on the operating characteristics. However, for nominal operation with nominal data it is possible to define a nominal mid position. In this position, for example, the connecting line between the tool centre and the fulcrum of the two-arm lever extends through the rotor axis.

If the tangent line to the path of movement of the first lever arm in the case of the maximum lever excursion extends through the rotor axis this results in an apparatus of very simple construction, which still produces a satisfactorily symmetrical swing-lever movement. For given rotor vibration angles and tool excursions the mechanical construction is based on the length of the first lever arm as well as the length of the connection-rod arm and the distance of the crank pin from the rotor axis.

In a special modification of the first embodiment of the invention the sum of the length of the connecting rod and the distance between the crank pin and the axis of the rotor shaft is equal to the length of the first lever arm, and for the maximum excursion the connecting line between the swing-lever fulcrum and the connecting-rod joint and the aligned connecting lines between the connecting-rod joint and the crank pin and between the crank pin and the axis of the rotor shaft form a right angle. This enables a very easy-to-handle and compact design to be obtained.

The vibratory movements of the lever and of the tool depend not only on the vibratory movement of the rotor but also on the path of movement described by the connecting-rod joint swing to the mechanical construction.

In a further modification of the first embodiment of the invention the tangent line to the circular arc of movement described by the connecting-rod joint about the swing-lever fulcrum during the vibratory movement extends through the rotor shaft when the swing lever is in the mid position during rated duty.

If in the nominal mid position the tangent line to the path of movement extends through the rotor axis a highly symmetrical movement of the swing lever is obtained with equal amplitudes in both directions of movement of the rotor.

Another advantageous modification of the first embodiment of the vibration system can be obtained in that the connecting rod is made of a plastic, the connecting-rod joint being constructed as an integral hinge. Replacing the connecting-rod joint by an integral hinge greatly simplifies the construction. If in accordance with a further modification of the first embodiment the connecting rod is constructed to be longitudinally elastic this construction, which has a damping action, enables the system movement to be improved. Load peaks are smoothed out.

Figure 2A:
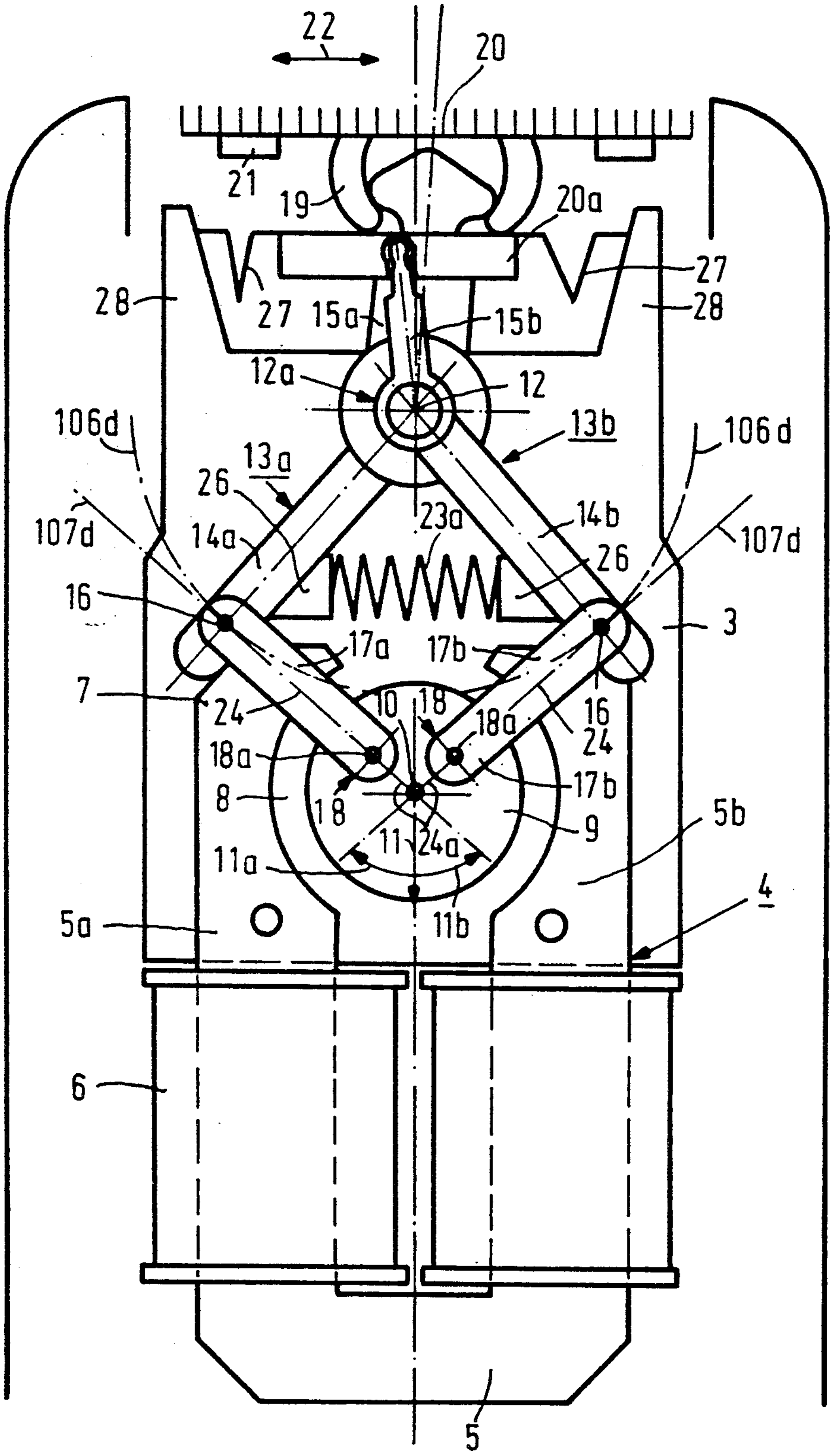

In a further modification of the first embodiment of the invention in addition to the first two-arm swing lever a second two-part swing lever is mounted on the same swing-lever fulcrum independently of said first swing lever, which second swing lever comprises a first and a second lever arm, the two first lever arms being connected via connecting-rod joints, connecting rods and crank-pin joints, the two connecting rods having the maximum excursion and the swing-levers being in opposite dead center positions, in the rest position of the rotor, the two swing levers perform the same vibratory movement but oppositely directed, a pressure spring being arranged between the two first lever arms, one of the two second lever arms drives the tool and the other one of the two second lever arms carries a counterbalancing mass to provide vibration damping, in the rest position of the rotor the tangent lines to the paths of movement of the two first lever arms and the extensions of the connecting lines between the associated connecting-rod joint and crank pins in the condition of maximum excursion extend through the rotor shaft and the lever arrangement is symmetrical about the central axis of the drive system in the rest position of the rotor (FIG. 2*a*).

This enables a very quiet and vibration-free operation to be obtained.

In a modification of the second embodiment of the invention the connecting rod may be dispensed with if the drive system is constructed in such a way that the first lever arm is constructed as a slot-type converter having a longitudinal slot which is engaged by an eccentric pin of the motor.

A very simple construction is obtained in that the first lever arm is longitudinally elastic and engages with the eccentric pin without a longitudinal slot or the like. The longitudinal elasticity then provides the length variation required along the movement of the swing-lever.

In principle, such a slot-type converter operates in the same way as a drive comprising a connecting rod but it is simpler to realize and comprises fewer parts.

In the third embodiment of the invention the tool is also in the mid position when the rotor is in the rest position. In the configuration described above, when the rotor vibrates symmetrically about its rest position, a symmetrical vibration of the tool about the above-defined mid position is obtained with equal excursions to the right and to the left. The length of the excursions depend on the vibration range of the rotor.

The fundamental of the lever vibration now has the same frequency as the rotor vibration, which is equal to the frequency of the applied voltage. Such a construction is favourable if the described drive mechanism is to be used with a two-part lever and a connecting rod, for example, for reasons of standardization, and if frequency doubling is not required, for example if the drive frequency is already 100 Hz or if the operating frequency is high enough for the operation of the apparatus. This situation applies to, for example, hair trimmers.

In a further modification of the third embodiment of the invention characterized in that in addition to the first two-part swing lever a second two-part swing lever is mounted on the same swing-lever fulcrum independently of said first swing lever, which second swing lever comprises a first and a second lever arm, the two first lever arms acting on the rotor via connecting-rod joints, connecting rods and crank-pin joints, the two connecting rods and the swing levers being in nominal mid positions in the rest position of the rotor, the two levers perform the same vibratory movement but oppositely directed, the rotor being held in its center position by spring means acting on the two first lever arms when at rest, one of the two second lever arms drives the tool and the other one of the two second lever arms carries a counterbalancing mass to provide vibration damping, in the rest condition of the rotor the tangent lines to the paths of movement of the two first lever arms extend through the crank pins and the connecting lines between the associated connecting-rod joints and crank pins form an angle of substantially 90° with the the connecting lines between the crank pins and the axis of the rotor shaft.

In a special embodiment the balancing mass, which acts on one of the second lever arms, is a trimmer or a shaver accessory.

An advantageous modification of the third embodiment of the vibrating system can be obtained in that the connecting rod is made of a plastic, the connecting-rod joint being constructed as an integral hinge. Replacing the connecting-rod joint by an integral hinge considerably simplifies the construction. If in a further modification of the invention the connecting rod is constructed to be longitudinally elastic this construction, which provides a damping action, enables the movement of the system to be improved. Load peaks are smoothed out.

In the fourth embodiment of the invention a very simple construction is obtained if the first lever arm is constructed to be longitudinally elastic and engages with the eccentric pin without a longitudinal slot or the like. In this case the longitudinal elasticity provides the length variation required during the movement of the swing lever.

In principle, such a slot-type converter operates in the same way as a drive system comprising a connecting rod but it is easier to realize and comprises a smaller number of parts.

In a further embodiment of the invention the rotor is supported in a torsion-spring element. The torsion-spring element may be made of rubber or another elastic material and can take the place of the otherwise required rotor shaft and the rotor bearing.

Supporting swing levers requires a very stable and low-wear construction with small tolerances in order to keep the production of noise within limits.

In a further embodiment of the invention the swing lever is supported in a torsional rubber element. The torsional rubber element, which may be for example of a coaxial construction, has its inner ring rigidly connected to the pivot and its outer ring to the swing lever. The interposed rubber ring is so elastic that comparatively small vibration angles can be obtained. This has the advantage that there are no bearing tolerances and that the system operates quietly and is of a simple construction. Moreover, it assists the return force of the springs. If the rotor and/or the swing-lever are supported by means of torsion-spring elements the return spring forces may be dispensed with, if said elements provide an adequate return force.

In a further embodiment of the invention the swing-lever fulcrum of the swing lever takes the from of a diagonal-link hinge made of a plastic, having link ends which act upon the swing lever and having other link ends which act upon a swing-lever pivot. Such a hinge operates without bearing tolerances and is therefore inherently quiet. Since it is injection-moulded from a plastic its construction is simpler than that of a conventional bearing.

In a further embodiment of the invention the swin-lever fulcrum, which takes the form of a diagonal-link hinge, is arranged on a bridge by means of a plug-in mount, which bridge is laterally supported on the mounting plate. A special supporting bridge for the swing-lever support is extremely stable and also exhibits a certain elasticity to compensate for tolerances.

In a further embodiment of the invention the first lever arm forms a first side of a geometrical figure, in particular a triangle or a trapezium, the swing-lever fulcrum, which takes the form of a diagonal-link hinge, being situated in the area where the first and the second side, which form an angle with one another, diverge and in that the pressure spring acts from the exterior on the second side. The point on which the pressure spring acts can then be situated in an area which is favourable for the construction of the apparatus.

In a further embodiment of the invention the spring element has a progressive characteristic. A progressive characteristic enables the vibration amplitude of the vibration tool to be limited simply in the case of a high mains voltage.

In another embodiment of the invention the motor is a two-pole single-phase synchronous motor, comprising a permanent-magnet rotor having a stator bore which is symmetrical about the central axis of the rotor shaft, which extends parallel to the main-stator-field direction. The single-phase synchronous motor can be powered with a direct voltage. The direct voltage may be applied in the form of voltage pulses. Alternatively, commutation is possible by mechanical means.

In a further embodiment of the invention voltage pulses of only on polarity are applied to the single-phase synchronous motor. If voltage pulses of only one polarity are applied to the motor the rotor will rotate from its rest position to its excursion position against the spring pressure and after removal of the voltage pulses the spring will return the drive system with the rotor towards the rest position. Consequently, no electrical alternating torque has to be applied to the rotor but merely a starting torque in one direction.

In a further embodiment of the invention the frequency of the voltage pulses is 100 Hz or 120 Hz. As a result of this, the mechanical vibration frequency need not be doubled.

In another embodiment of the invention the pulse frequency is higher than 120 Hz, for example 360 Hz. This enables the vibration frequency of the tool to be increased, which may lead to improved operation.

In a further embodiment of the invention the rotor is at least partly encapsulated in a plastic, the crank pin being molded on. This stabilizes the ceramic rotor and enables the crank pin to be secured in a favorable manner.

Figure 1B:
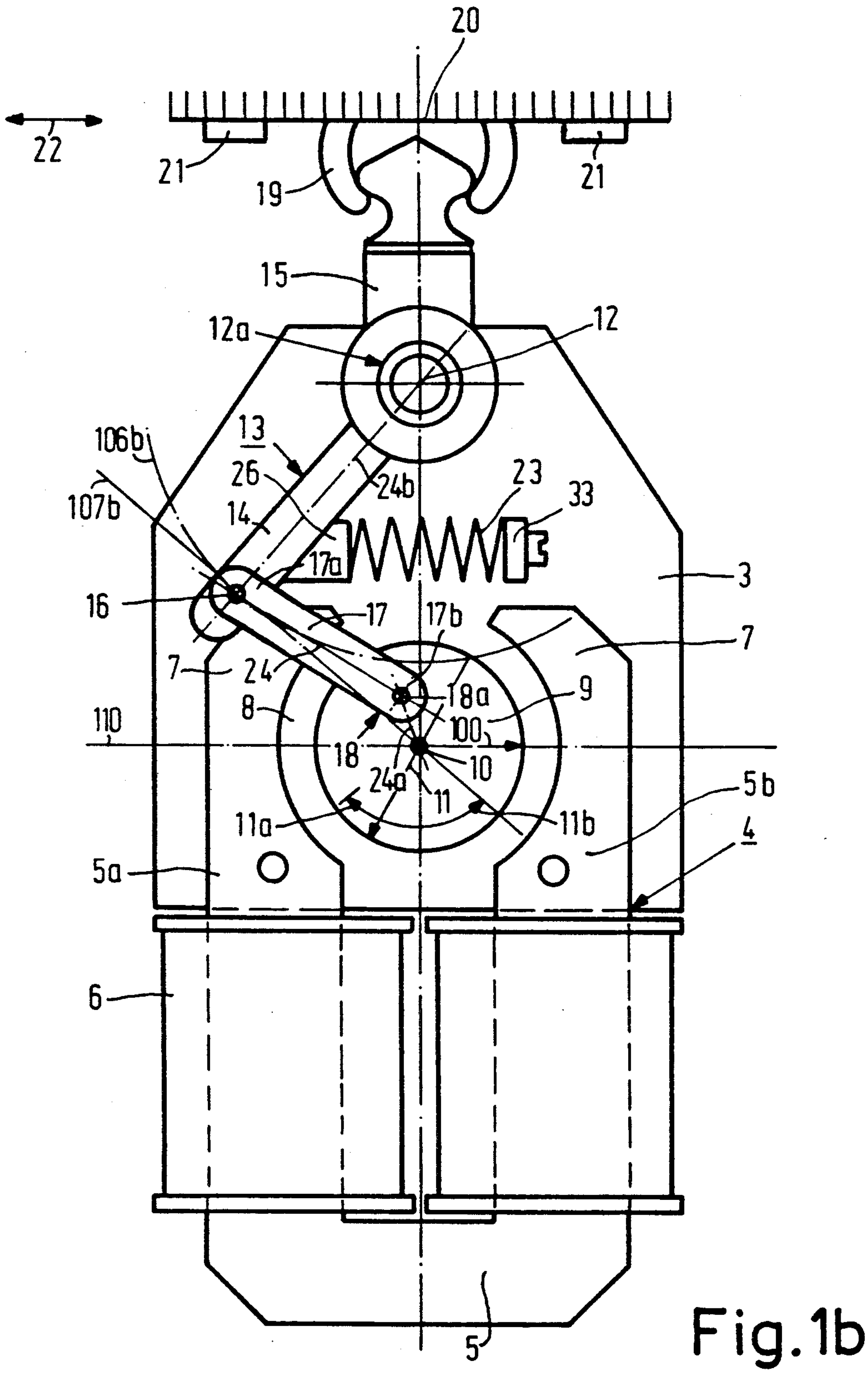
Figure 1C:
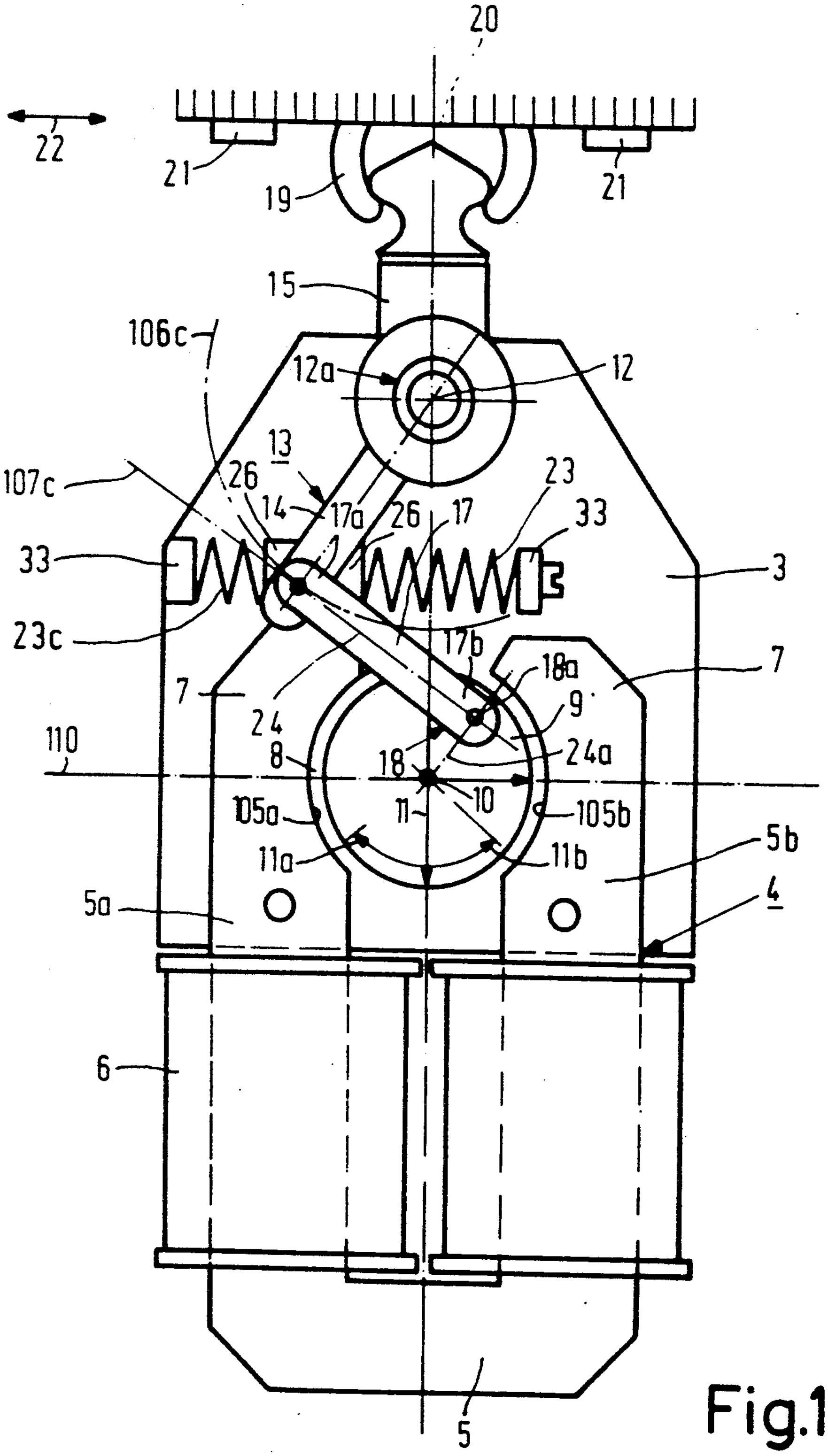
Figure 2B:
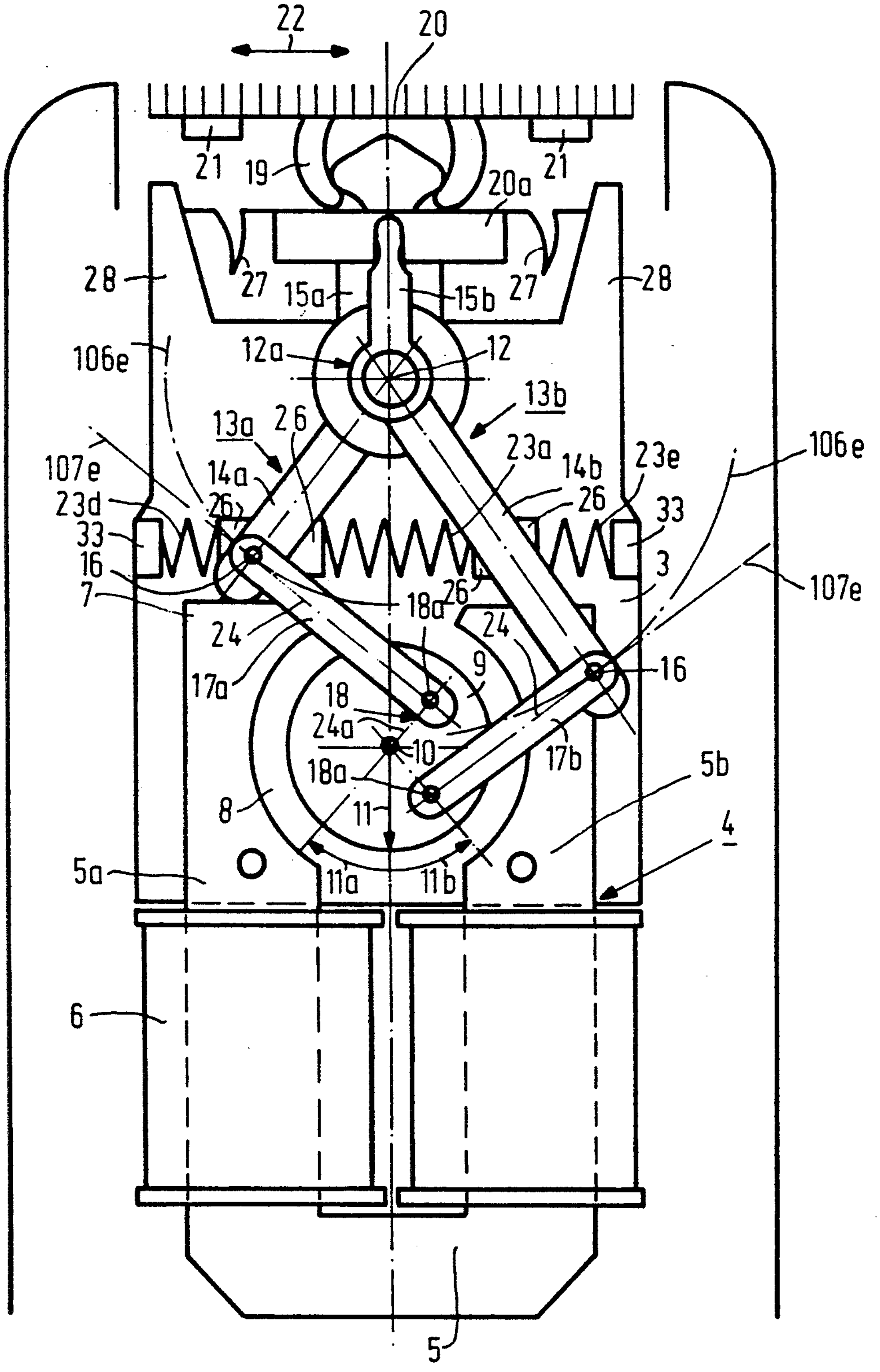
Figure 3:
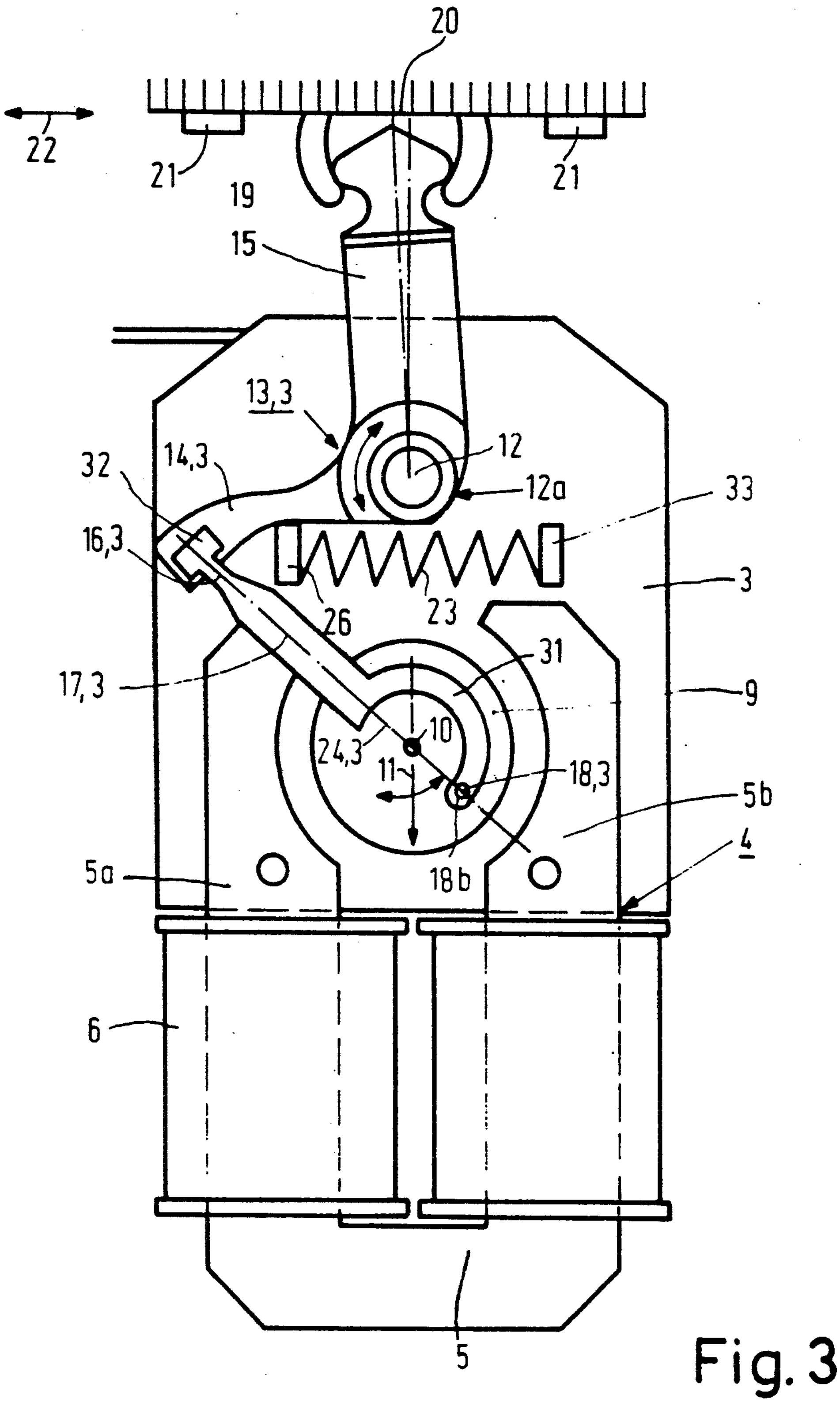
Figure 4A:
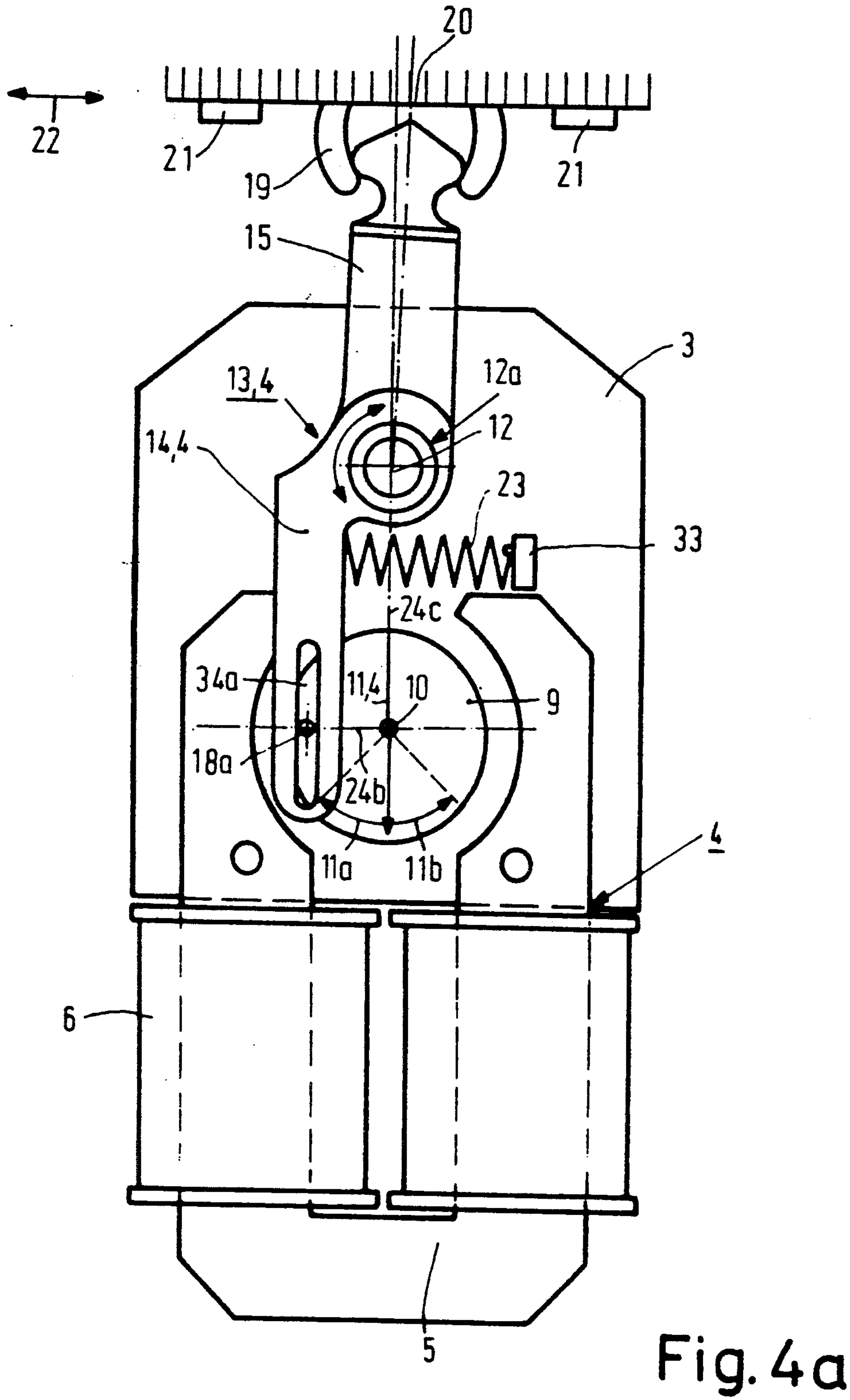
Figure 4B:
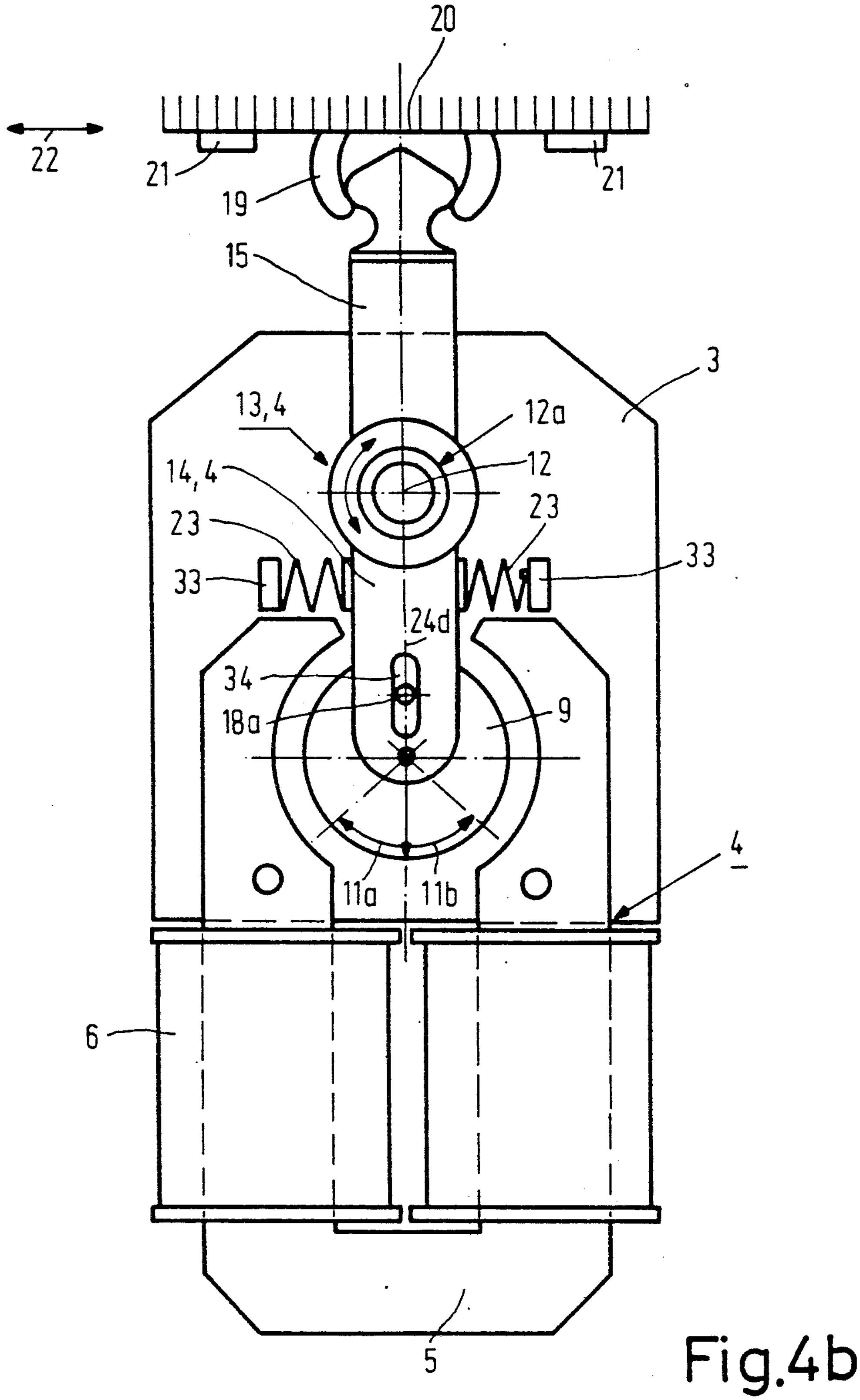

The invention will now be described in more detail, by way of example, with reference to the drawings. In the drawings:

FIGS. 1*a* to 1*c* show a drive system for a cutter of a domestic vibration apparatus, comprising a single-phase sychronous motor having a permanent-magnet rotor and a swing-lever transmission system, three different lever drives at the rotor being shown, FIGS. 2*a* and 2*b* show a modification of the swing-lever transmission system shown in FIGS. 1*a* to 1*c*, comprising two oppositely acting vibration-system parts and different coupling variants, FIG. 3 shows a modification of the drive system shown in FIG. 1, a connecting rod arranged between the rotor and the swing lever being provided with an integral hinge and being longitudinally elastic, FIGS. 4*a* and 4*b* show a modification of the drive system shown in FIG. 1*a*, a pin of the rotor engaging a slot in the swing-lever.

Figure 4C:
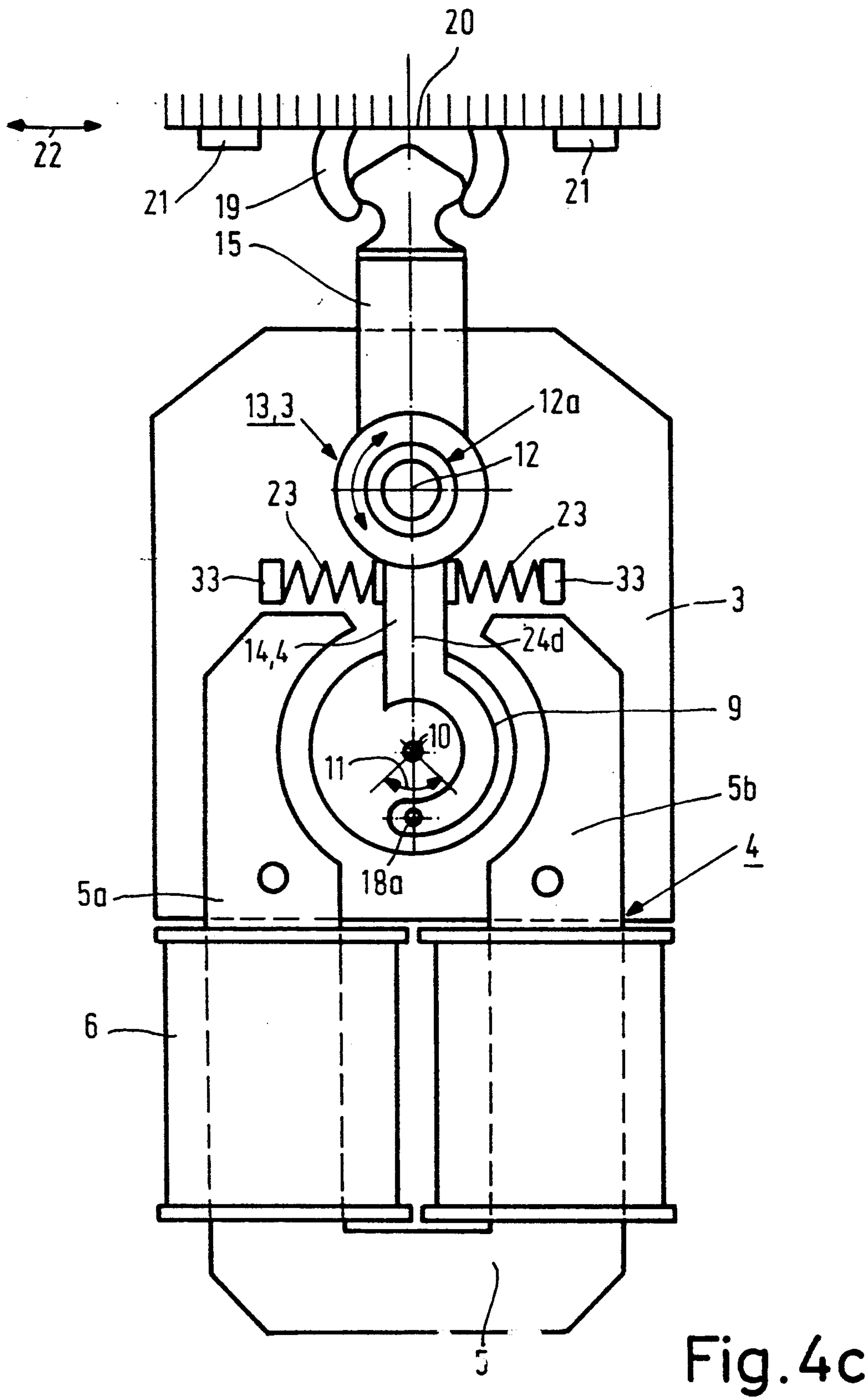
Figure 5:
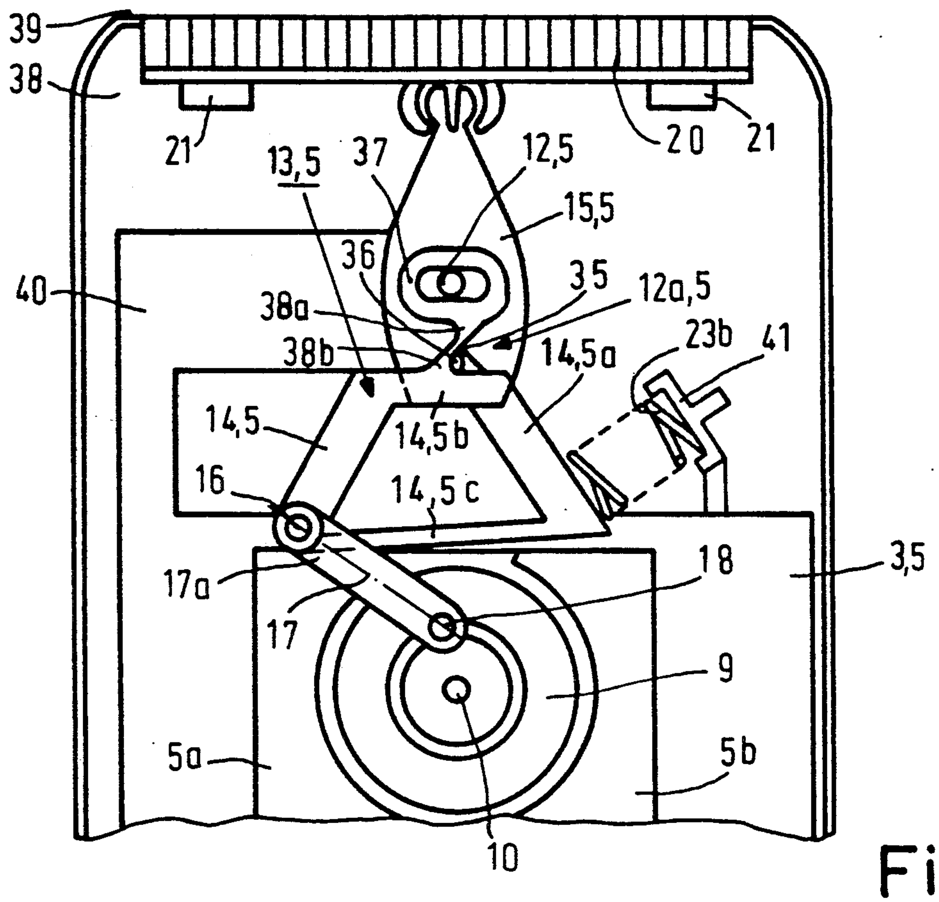
Figure 7:
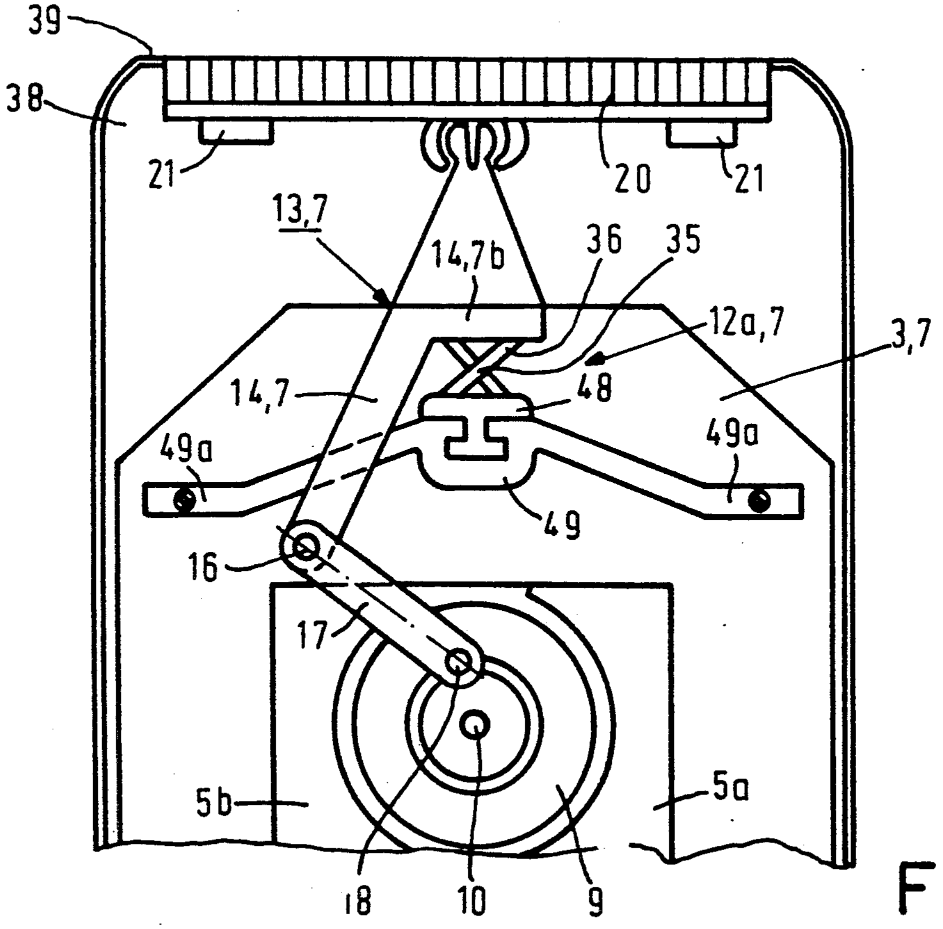
Figure 6:
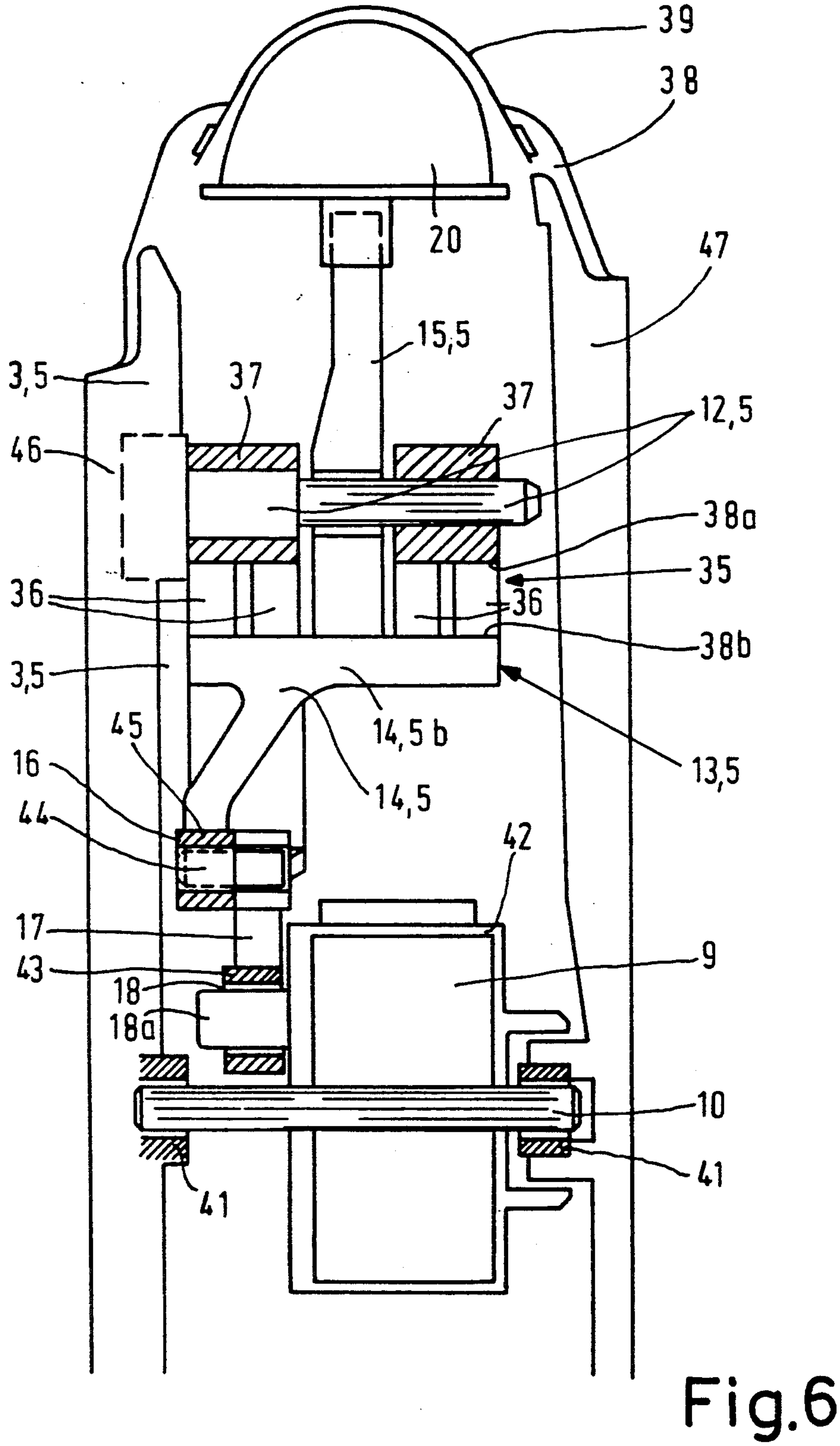
Figure 8:
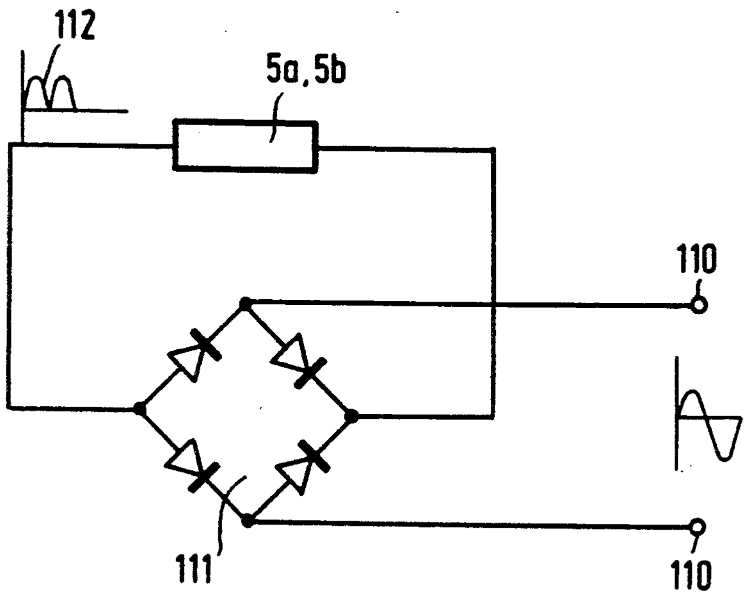

FIG. 4*c* shows a modification of the drive system shown in FIG. 4*b*, the slot construction being replaced by a longitudinally elastic lever arm, FIG. 5 shows a modification of the swing-lever system in FIGS. 1*a* to 1*c*, in which the swing lever is suspended by means of a diagonal-link hinge, FIG. 6 is a sectional view of the swing-lever system shown in FIG. 5, FIG. 7 is a modification of the swing lever suspension comprising a diagonal-link hinge and supported on the housing by means of a bridge, and FIG. 8 is a circuit diagram of a simple electronic frequency-doubling circuit.

FIG. 1*a* shows a single-phase synchronous motor 4 arranged on a mounting plate 3. This single-phase synchronous motor comprises a U-shaped stator iron 5 having two limbs 5*a* and 5*b*. The parallel limbs carry exciter coils 6 arranged in series. The free ends of the limbs 5*a* and 5*b* form stator poles 7. In the air gap 8 between the stator poles 7 a two-pole permanent-magnet rotor 9 is mounted for rotation about a shaft 10. Suitably, the rotor is encapsulated in a plastic, the crank pin 18*a* being molded on. The direction of magnetization of the rotor is indicated by an arrow 11. At the location of the air gap 8 the outlines 105*a* and 105*b* of the limbs 5*a* and 5*b* are symmetrical relative to the center line 110, i.e. in contradistinction to the customary single-phase synchronous motors they do not exhibit an asymmetry.

A two-arm lever 13, comprising a first lever arm 14 and a second lever arm 15, is supported on a pivot 12 on the mounting plate. The free end of the first lever arm 14 comprises a connecting-rod joint 16, which cooperates with one end 17*a* of a connecting rod 17. The other end 17*b* of the connecting rod is journalled on a crank pin 18*a* of the rotor 9 by means of a crank-pin joint 18. The second lever arm 15 engages members 19 of a cutter 20 of a dry-shaver. By means of supports 21 the cutter 20 is supported in such a way that it can reciprocate in the direction indicated by a double arrow 22.

A pressure spring 23 acts on the first lever arm 14 to urge the first lever arm 14, when the single-phase synchronous motor 4 is not energized, into a position in which the extension of the connecting line 24 between the connecting-rod joint 16 and the crank pin 18*a* extends substantially through the rotor shaft 10. In this situation the drive system is in a first dead center position, in which the excursion of the connecting rod 17 is maximal. In the first dead-center position the rotor couples a position in which its average direction of magnetization, indicated by the arrow 11, is oriented perependicularly to the stator-field direction, indicated by the arrow 100, the stator-field direction being substantially parallel to the center line 110. When the motor 4 is energized the forces in the air gap 8 rotate the rotor 9 against the spring force into a second end position, in which the directions of movement of the rotor 9 and the connecting rod 17 are reversed. It is obvious that the spring return forces should be adequate for this purpose.

The rotor 9 of the single-phase synchronous motor 4 thus oscillates or vibrates to and fro, the average direction of magnetization of the rotor being shifted to the left and to the right from an arrowhead 11*a* to the other arrowhead 11*b*. The pressure spring 23 is dimensioned in such a way that the rotor 9 cannot perform a complete revolution.

The spring 23 may be of metal, plastic or rubber; the last-mentioned material provides a stronger damping of the drive system. In particular, a rubber spring can limit the oscillation amplitude of the rotor 9 in the case of a high mains voltage. For this purpose the spring characteristic is preferably progressive.

The lever drive comprising the two-arm lever 13 and the connecting rod 17 is constructed in such a way that in the rest position of the rotor 9 the extension of the connecting line 24 between the connecting-rod joint 16 and the crank pin 18*a* extends through the rotor shaft 10, a tangent line 107*a* to the circular arc of movement 106 described by the joint 16 about the swing-lever fulcrum 12*a* during the vibratory movement, extending through the rotor shaft 10.

FIG. 1*b* corresponds to the embodiment shown in FIG. 1*a*, the difference being that the lever-drive geometry is modified so as to improve the symmetry of the movement of the lever 13.

The construction is selected in such a way that the tangent line 107*b* to the circular arc of movement 106*b*, described by the connecting-rod joint 16 about the swing-lever fulcrum 12*a* during the vibratory movement, extends through the rotor shaft 10 when the swing lever 13 is in its mid position during rated duty.

FIG. 1*c* illustrates a further method of coupling the connecting rod 17 to the rotor 9. In the rest position of the rotor 9 the connecting line 24 between the connecting-rod joint 16 and the crank pin 18*a* and the connecting line 24*a* between the crank pin 18*a* and the rotor shaft 10 form an angle of substantially 90°, the tangent line 107*c* to the path of movement 106*c* of the connecting-rod joint 16 in this position extending substantially through the crank pin 18*a*. Again the spring should be constructed in such a way that it brings the rotor into the position in which its direction of magnetization is oriented perpendicularly to the average stator-field direction. This can be achieved for axample by spring means 23, 23*c* supported to the right and the left of the first lever arm 14 and acting against abutments 33 on the mounting plate 3.

FIG. 2*a* shows another embodiment of a vibration drive for a domestic vibration apparatus, which is a modification of that shown in FIGS. 1*a* to 1*c*. In this case the drive system comprises two double-arm levers 13*a* and 13*b* having first lever arms 14*a*, 14*b* and second lever arms 15*a* and 15*b*. The lever arms 14*a* and 14*b* are coupled to connecting rods 17*a* and 17*b* via connecting-rod joints 16 and to the crank pins 18*a* of the rotor 9 via crank-pin joints 18. In the first dead-center position the extensions of the connecting lines 24 between the connecting-rod joints 16 and the crank-pin joints 18 of the two transmission-lever arms shown in FIG. 2*a* extend through the rotor shaft 10.

In the case the spring 23*a* acts on the two lever arms 14*a* and 14*b* at points 26 and consequently acts between the arms 14*a*, 14*b*.

The arm 14*a* forms part of a two-arm lever 13*a* having a second lever arm 15*a* . The arm 14*b* forms part of a two-arm lever 13*b* having second lever arm 15*a*. The lever arm 15*a* acts on the cutter 20, while the lever arm 15*b* is coupled to a counter-balancing mass 20*a* which is supported on projecting portions 28 of the mounting plate 3 via damping springs 27. The levers 13*a* and 13*b* are supported on the pivot 12.

By means of the construction shown in FIG. 2*a* and the mass 20*a* the vibrations of the apparatus, which are already comparatively small, can be reduced even further. The damping springs 27 between the portions 28 of the mounting plate 3 provide a further damping.

The arrangement is such that in the rest position of the rotor 9 the two connecting rods have a maximal excursions and the swing levers 13*a*, 13*b* are in opposite dead-center positions, such that the two swing-lovers 13*a* and 13*b* perform the same vibratory movement but in opposite directions. Moreover, in the rest position of the rotor 9 the tangent lines 107*d* to the paths of movement 106*d* of the two first lever arms 14, 14*b* and the extensions of the connecting lines 24 between the associated connecting-rod joints 16 and the crank pin 18*a* extend through the rotor shaft 10 in the condition of maximum excursion and the arrangement is symmetrical about the central axis of the system in the rest position of the rotor 9.

The embodiment shown in FIG. 2*b* corresponds to the embodiment shown in FIG. 2*a*, except for the coupling of the connecting rods 17*a*, 17*b*, to the crank pins 18*a* of the rotor 9. In this case the connecting rods 17*a*, 17*b* are coupled in such a way that in the rest position of the rotor 9 the two connecting rods 17*a*, 17*b* and the swing levers 13*a* and 13*b* are in the nominal mid position and in the rest position of the rotor 9 the tangent lines 107*e* to the paths of movement 106*e* of the two first lever arms 14*a*, 14*b* extend through the crank pins 18*a*.

The spring means comprise three springs 23*a*, 23*d* and 23*e*. The two outer springs 23*d* and 23*e* act on abutments 33 of the mounting plate and on a first lever arm 14*a* or 14*b*. The third spring 23*a* is arranged between the first lever arms 14*a*, 14*b* at points 26 on the lever arms.

The connecting lines 24 between the associated connecting-rod joints 16 and the crank pins 18*a* and the connecting lines 24*a* between the crank pins 18*a* and the rotor shaft 10 then form an angle of substantially 90°.

In FIG. 3 the connecting rod 17, 3 is modified in comparison with the connecting rod 17 shown in FIGS. 1*a* to 1*c* and the first lever arm 14, 3 is adpated accordingly. The connecting rod 17, 3 comprises a plastic member having a crank-pin joint 18, 3 with which it cooperates with the crank pin 18*b*. The crank-pin 18*b* and the crank-pin joint 18, 3 are diametrally shifted relative to the corresponding parts in FIG. 1. As a result of this, the cutter end-position is reversed in the rest position of the rotor. The plastic connecting rod 17, 3 comprises an arcuate portion 31 surrounding the rotor shaft 10 in order to ensure that it does not collide with the rotor shaft 10. The connecting rod 17, 3 is coupled to the first lever arm 14, 3 by means of a plug-in joint 32. An integral hinge 16, 3 is situated directly adjacent the joint 32 to replace the connecting-rod joint 16 in FIG. 1. The pressure spring 23 is arranged between a projection 33 on the base plate 3 and a projection 26 on the first lever arm 14, 3, thereby urging the first lever arm 14, 3 into a rest position in which a central axis 24, 3 extends through the integral hinge 16, 3, the rotor shaft 10 and the crank-pin joint 18, 3. In the present construction the connecting rod 17, 3 is longitudinally elastic and is hence vibration-damping. Further advantages of this constuction are that reversal of the movement proceeds more smoothly and without impulse-like load peaks.

In the embodiment shown in FIG. 4*a* one connecting rod has been dispensed with. The first lever arm 14, 4 is formed with a logitudinal slot 34*a* in which the crank pin 18*a* engages. In the rest position of the rotor 9 the direction of magnetization is as indicated by the arrow 11, 4. In the present arrangement the rotor is in a rest position in which the crank pin 18*a* is situated substantially in the centre of the slot 34*a*. The arrangement is such that in the rest position of the rotor 9 the line 24*b* between the eccentric pin 18*a* and the rotor shaft 10 and the line 24*c* between the rotor shaft 10 and the swing-lever fulcrum 12 form a right angle. When the rotor is energized with an alternating voltage it will first rotate in the direction indicated by the arrow 11*a* against the action of the spring 23, thereby also rotating the swing lever 13, 4, and subsequently it will be rotated back in the direction indicated by the arrow 11*b*, the end positions being indicated by the arrowheads. This construction comprises a smaller number of mechanical parts and is very simple to manufacture. It is a version which exhibits frequency doubling.

In a modification of the drive mechanism the swing lever 13, to 13, 4 can also be supported in a torsional rubber element whose outer mounting ring is fixedly connected to the swing lever 13 to 13, 4 and whose inner mounting ring is fixedly connected to the pivot 12.

The embodiment shown in FIG. 4*b* corresponds to the embodiment shown in FIG. 4*a*, the difference being that in the rest position of the rotor 9 the line 24*d* between the rotor shaft 10 and the swing-lever fulcrum 12*a* extends through the eccentric pin 18*a*. This is version without frequency doubling.

FIG. 4*c* illustrates an embodiment of even simpler construction. In this case the eccentric pin 18*a* does not move in a slot in the first lever arm 14, 4. The variation in distance between the swing-lever fulcrum 12*a* and the eccentric pin 18*a* during the vibratory movement can be obtained in that the first lever arm 14, 4 is constructed to be longitudinally elastic. For the version without frequency doubling the line 24*d* between the swing-lever fulcrum 12*a* and the rotor shaft 10 extends through the eccentric pin in the rest position of the rotor 9.

FIG. 5 shows an embodiment of the drive system of a vibration apparatus, in which the swing-lever fulcrum 12*a*, 5 has been replaced by a diagonal-link hinge 35 whose links 36 cross one another. The pivot 12, 5 is stepped and engages a mounting ring 37 of the hinge 35. First ends 38*a* of the links 36 are connected to said ring 37. The other ends 18*b* of the links act upon the first lever arm 14, 5. The second lever arm 15, 5 of the swing-lever 13, 5 drives the cutter 20 to move said cutter underneath a shear foil 39, which is clamped in a shaving head 38. The pivot 12, 5 is connected to the mounting plate 3, 5 via a member 40.

The swing lever 13, 5 with its first lever arm 14, 5 and its second lever arm 15, 5 as well as the mounting ring 37 are molded to an integral plastic part together with the links 36. With this construction the swing-lever fulcrum 12*a*, 5 will be situated at the location of the links 36. Moreover, the swing-lever arrangement can be adapted to specific constructional features which are necessary or desirable. For example, the first lever arm 14, 5 forms a first side of a geometrical figure, in particular a triangle or trapezium, with the diagonal-link hinge 35 being satuated in the area where the first and the second sides 14, 5 and 14, 5*a*, which form an angle with one another, converge. The geometrical figure, which has the shape of a trapezium or trapezoid and which comprises the first lever arm shown in FIG. 5, in addition to the two sides 14, 5 and 14, 5*a* comprises a trapezium side 14, 5*b* in the convergence area and another trapezium side 14, 5*c* in the divergence area. The pressure spring 23 acts against the second side 14, 5*a* and its pressure is adjustable by means of an adjustable clamping element 41.

The advantage of this construction is that the spring and the point on which the spring acts can be adapted arbitrarily to the given geometry and design specifications.

FIG. 6 shows the drive system of FIG. 5 in a side view and partly in sectional view. How the sectional view has been taken is not indicated in FIG. 5 because this is too intricate. The sectional view is given to illustrate the construction and the cooperation between the drive elements and supporting points. The shaft 10 of the rotor 9 of the single-phase synchronous motor 4 is supported in plain bearings 41. The permanent-magnet rotor 9 is provided with a plastic encapsulation 42 with which the crank pin 18*a* is integral. The crank pin 18*a* and the bearing shell 43 on the connecting rod 17 together constitute the crank-pin joint 18 on the rotor. The connecting-rod joint 16 is formed by a pivot 44 on the end portion 17*a* of the connecting rod 17 and an associated bearing shell 45 on a first lever arm 14, 5. The first lever arm 14, 5 and the ends 38*b* of the diagonal links 36 act upon the side 14, 5*b* of the parallellogram. The second lever arm 15, 5 has a bore, enabling it to move freely about the pivot 12, 5 which has the form of a pin at this location. The mounting rings 37 of the hinge 35 tightly engage around the pivot 12, 5.

The drive mechanism and the motor are secured to the mounting plate 3, 5 between the narrow side walls 46, 47 of the apparatus housing.

In the arrangement shown in FIG. 7 the suspension of the swing lever in the housing of the apparatus and on the mounting plate 3, 7 has been further modified. At the location of the hinge 35 the swing lever 13, 7 again comprises the diagonal links 36 as shown in FIGS. 5 and 6. These links 36 cross one another and extend from the lever-arm side 14, 7*b* to a plug-in mount 48 on a bridge 49. The swing-lever 13, 7 with the links 36 and the mount 38 form an integral plastic part, which plastic material should provide the elasticity of the links at the location of the hinge 35. The mount 48 is fitted in a plastic bridge 49, whose ends 49*a* and 49*b* are secured to the mounting plate 3, 7 by means of screws or in another way. The advantage of the construction is that tolerances can be compensated for very effectively and the stability of the arrangement is high.

A simple electronic drive is obtained by means of a full-wave rectified alternating voltage as illustrated in FIG. 8. An alternating mains voltage having a frequency of 50 Hz or 60 Hz is applied to the terminals 110. A full-wave rectifier 111 rectifies the alternating mains voltage to form a direct voltage 112 of twice said frequency, i.e. 110 Hz or 120 Hz, which voltage is applied to the stator coils 5*a*, 5*b*. In this way the vibration frequency is doubled.

It is obvious that the individual constructional elements of the drive system shown in FIGS. 1 to 8 may be interchanged if this is technically favourable. The use of the individual elements depends on the constructional specifications and the efficiency of the relevant solution.

We claim:

1. A domestic vibration apparatus in which movements of a two-pole permanent magnet (9) forming a rotor in a stator arrangement energized by means of coils produce a vibratory movement of a vibration tool via a lever system (13) coupled to the movements of the rotor (9), a return - spring force acting on the lever system (13) to preload the drive system comprising the lever system (13) and the rotor (9) in such a way that the rotor (9) can oscillate about a rest position, the lever system (13) comprising a two-arm swing lever and being connected to an eccentrically disposed pin of the rotor (9), characterized in that the two-pole permanent magnet rotor (9) is without pole-pieces and is arranged in the U-shaped stator of a single-phase synchronous motor, and a first lever arm (14) of the two-arm swing lever (13) and the rotor (9) are interconnected by a connecting rod (17) which at one end is articulated to the first lever arm (14) by means of a connecting-rod joint (16) and at its other end is eccentrically articulated to the rotor (9) by means of a crank pin (18*a*)

2. A domestic vibration apparatus as claimed in claim 1, characterized in that said return-spring force preloads the drive system of said apparatus in such a way that when the stator coils (6) are not energized, the rest position of the rotor (9) coincides with a position in which the average direction of magnetization (11) of the rotor (9) is oriented substantially perpendicularly to the average magnet-field direction (100) of the stator arrangement.

3. A domestic vibration apparatus as claimed in claim 2, characterized in that in the rest position of the rotor (9) an extension of a connecting line (24) between the connecting-rod joint (16) and the crank pin (18*a*) extends through the rotor shaft (10), so that the mechanical vibration frequency of the swing lever (13) is doubled relative to that of the rotor (9).

4. A domestic vibration apparatus as claimed in claim 1, characterized in that a tangent line (107*b*) to a circular arc of movement (106*b*) described by the connecting-rod joint (16) about the swing-lever fulcrum (12*a*) during the vibratory movement extends through the rotor shaft (10) when the swing lever (13) is in the mid position during rated duty (FIG. 1*b*).

5. A domestic vibration apparatus as claimed in claim 1, characterized in that in addition to the first two-arm swing lever (13*a*) a second two-part swing lever (13*b*) is mounted on the same swing-lever fulcrum (12*a*) independently of said first swing lever, which second swing lever comprises a first (14*b*) and a second lever arm (15*a*), the two first lever arms (14*a*, 14*b*) being connected via connecting-rod joints (16), connecting rods (17*a*, 17*b*) and crank-pin joints (18), the two connecting rods (17*a*, 17*b*) having the maximum excursion and the swing levers (13*a*, 13*b*) being in opposite dead center positions, in the rest position of the rotor (9), the two swing-levers (13*a*, 13*b*) perform the same vibratory movement but oppositely directed, a pressure spring being arranged between the two first lever arms (14*a*, 14*b*), one of the two second lever arms (15*a*, 15*b*) drives the tool (20) and the other one of the two second lever arms (15*a*, 15*b*) carries a counterbalancing mass (20*a*) to provide vibration damping, in the rest position of the rotor (9) the tangent lines (107*d*) to the paths of movement (106*d*) of the two first lever arms (14*a*, 14*b*) and the extensions of the connecting lines (24) between the associated connecting-rod joints (16) and crank pins (18*a*) in the condition of maximum excursion extend through the rotor shaft (10) and the lever arrangement is symmetrical about the central axis of the drive system in the rest position of the rotor (9) (FIG. 2*a*).

6. A domestic vibration apparatus as claimed in claim 5, characterized in that the counterbalancing mass (20*a*), upon which one of the second lever arms (15*a*, 15*b*) acts, is a trimmer or a shaver accessory.

7. A domestic vibration apparatus as claimed in claim 1, characterized in that the connecting rod (17,3) is made of a plastic, the connecting-rod joint (16,3) being constructed as an integral hinge.

8. A domestic vibration apparatus as claimed in claim 7, characterized in that the connecting rod (17,3) is constructed to be longitudinally elastic.

9. A domestic vibration apparatus as claimed in claim 1, characterized in that in addition to the first two-part swing lever (13*a*) a second two-part swing lever (13*b*) is mounted on the same swing-lever fulcrum (12*a*) independently of said first swing lever, which second swing lever comprises a first (14*b*) and a second lever arm (15*b*), the two first lever arms (14*a*, 14*b*) cooperating with the rotor (9) via connecting-rod joints (16), connecting rods (17*a*, 17*b*) and crank-pin joints (18), the two connecting rods (17*a*, 17*b*), the swing levers (13*a*, 13*b*) being in their nominal mid positions in the rest position of the rotor (9), the two levers perform the same vibratory movement but oppositely directed, the rotor being held in its center position by spring means (23*a*, 23*d*, 23*e*) acting on the two first lever arms (14*a*, 14*b*) when at rest, one of the two second lever arms (15*a*, 15*b*) drives the tool (20) and the other one of the two second lever arms (15*a*, 15*b*) carries a counterbalancing mass (20*a*) to provide vibration damping, in the rest position of the rotor (9) the tangent lines (107*e*) to the paths of movement (106*e*) of the two first lever arms (14*a*, 14*b*) extend through the crank pins (18*a*) and the connecting lines (24) between the associated connecting-rod joints (16) and the crank pins (18*a*) and the connecting lines (24*a*) between the crank pins (18*a*) and the axis of the rotor shaft (10) forming an angle of substantially 90° with one another (FIG. 2*b*).

10. A domestic vibration apparatus in which movements of a two-pole permanent magnet (9) forming a rotor in a stator arrangement energized by means of coils produce a vibratory movement of a vibration tool via a lever system (13) coupled to the movements of the rotor (9), a return - spring force acting on the lever system (13) to preload the drive system comprising the lever system (13) and the rotor (9) in such a way that the rotor (9) can oscillate about a rest position, the lever system (13) comprising a two-arm swing lever and being connected to an eccentrically disposed pin of the rotor (9), characterized in that the two-pole permanent magnet rotor (9) is without pole-pieces and is arranged in the U-shaped stator of a single-phase synchronous motor, the first lever arm (14,4) is constructed as a slot-type converter having a longitudinal slot (34*a*) in which an eccentric pin (18*a*) of the rotor (9) engages, in the rest position of the rotor (9) the connecting line (24*b*) between the eccentric pin (18*a*) and the rotor shaft (10) and the connecting line (24*c*) between the rotor shaft (10) and the swing-lever fulcrum (12*a*) form a right angle, the spring force pre-loads the drive system in such a way that when the stator coils (6) are not energized, the rest position of the permanent magnet forming the rotor (9) coincides with the position in which the average direction of magnetization (11) of the rotor (9) is oriented substantially perpendicularly to the average magnet-field direction (100) of the stator arrangement, so that the mechanical vibration frequency of the swing-lever (13) is doubled relative to the vibration frequency of the rotor (9) (FIG. 4*a*).

11. A domestic vibration apparatus as claimed in claim 10, characterized in that the first lever arm (14,5) is longitudinally elastic and engages with the eccentric pin (18*a*) without a longitudinal slot or the like (FIG. 4*c*).

12. A domestic vibration apparatus in which movements of a two-pole permanent magnet (9) forming a rotor (9) in a stator arrangement energized by means of coils produce a vibratory movement of a vibration tool which is coupled to the movements of the rotor (9) via a lever system (13), a return-spring force acting on the lever system (13) to pre-load the drive system comprising the lever system (13) and the rotor (9) in such a way that the rotor (9) can oscillate about a rest position, the lever system (13) comprising a two-arm swing lever and being connected to an eccentrically disposed pin of the rotor (9), characterized in that the two-pole permanent magnet rotor (9) is without pole-pieces and is arranged in the U-shaped stator of a single-phase synchronous motor, the first lever arm (14) of the two-arm swing-lever (13) and the permanent magnet rotor (9) are connected by a connecting rod (17) which at one end is articulated to the first lever arm (14) by means of a connecting-rod joint (16) and at its other end is articulated eccentrically to the rotor (9) by means of a crank pin (18*a*), the spring force pre-loads the drive system in such a way that when the stator coils (6) are not energized the rest position of the rotor (9) coincides with the position in which the average direction of magnetization (11) of the rotor (9) is oriented substantially perpendicularly to the average magnet-field direction (100) of the stator arrangement, in the rest position of the rotor (9) the connecting line (24) between the connecting-rod joint (16) and the crank pin (18*a*) and the connecting line (24*a*) between the crank pin (18*a*) and the axis of the rotor shaft (10) form an angle of substantially 90° with each other, in said position a tangent line (107*c*) to a path of movement (106*c*) of the connecting-rod joint (16) extends substantially through the crank pin, the rest position of the rotor (9) is established by spring means (23, 23*c*) arranged at opposite sides of the first lever arm (14) and acting on abutments (33) on the mounting plate (3), so that the vibration frequency of the swing lever and that of the rotor are the same, the desired vibration frequency of the swing lever is dictated by the electrical drive of the coils (FIG. 1*c*).

13. A domestic vibration apparatus as claimed in claim 12, characterized in that in addition to the first two-part swing lever (13*a*) a second two-part swing lever (13*b*) is mounted on the same swing-lever fulcrum (12*a*) independently of said first swing lever, which second swing lever comprises a first (14*b*) and a second lever arm (15*b*), the two first lever arms (14*a*, 14*b*) acting on the rotor (9) via connecting-rod joints (16), connecting rods (17*a*, 17*b*) and crank-pin joints (18), the two connecting rods (17*a*, 17*b*) and the swing levers (13*a*, 13*b*) being in nominal mid positions in the rest position of the rotor (9), the two levers perform the same vibratory movement but oppositely directed, the rotor being held in its center position by spring means (23*a*, 23*d*, 23*e*) acting on the two first lever arms (14*a*, 14*b*) when at rest, one of the two second lever arms (15*a*, 15*b*) drives the tool (20) and the other one of the two second lever arms (15*a*, 15*b*) carries a counterbalancing mass (20*a*) to provide vibration damping, in the rest condition of the rotor (9) the tangent lines (107*e*) to the paths of movement (106*e*) of the two first lever arms (14*a*, 14*b*) extend through the crank pins (18*a*) and the connecting lines (24) between the associated connecting-rod joints (16) and crank pins (18*a*) form an angle of substantially 90° with the connecting lines (24*a*) between the crank pins (18*a*) and the axis of the rotor shaft (10).

14. A domestic vibration apparatus as claimed in claim 13, characterized in that the counterbalancing mass (20*a*) which acts on one of the second lever arms (15*a*, 15*b*) is a trimmer or a shaver accessory.

15. A domestic vibration apparatus as claimed in claim 13, characterized in that the connecting rod (17,3) is made of a plastic, the connecting-rod joint (16,3) being constructed as an integral hinge.

16. A domestic vibration apparatus as claimed in claim 13, characterized in that the connecting rod (17,3) is constructed to be longitudinally elastic.

17. A domestic vibration apparatus in which movements of a two-pole permanent magnet (9) forming a rotor in a stator arrangement energized by means of coils produce a vibratory movement of a vibration tool via a lever system (13) coupled to the movements of the rotor (9), a return - spring force acting on the lever system (13) to preload the drive system comprising the lever system (13) and the rotor (9) in such a way that the rotor (9) can oscillate about a rest position, the lever system (13) comprising a two-arm swing lever and being connected to an eccentrically disposed pin of the rotor (9), characterized in that the two-pole permanent-magnet rotor is without pole-pieces and is arranged in the U-shaped stator of a single-phase synchronous motor, the first lever arm (14,4) is constructed as a slot-type converter having a longitudinal slot (34*a*) in which an eccentric pin (18*a*) of the rotor (9) engages, in the rest position of the rotor (9) the connecting line (24*d*) between the axis of the rotor shaft (10) and the swing-lever fulcrum (12*a*) extends through the eccentric pin (18*a*), the spring force pre-loads the drive system in such a way that when the stator coils (6) are not energized the rest position of the rotor (9) coincides with the position in which the average direction of magnetization (11) of the rotor (9) is oriented substantially perpendicularly to the average magnet-field direction (100) of the stator arrangement, so that the mechanical vibration frequency of the swing lever is equal to that of the rotor, the desired vibration frequency of the swing lever is dictated by the electrical drive of the coils (FIG. 4*b*).

18. A domestic vibration apparatus as claimed in claim 17, characterized in that the first lever arm (14,4) is constructed to be longitudinally elastic and acts on the eccentric pin **(18*a*)** without a longitudinal slot or the like (FIG. 4*c*).

19. A domestic vibration apparatus as claimed in either one of the claims 16 or 17, characterized in that the rotor (9) is supported in a torsional-spring element.

20. A domestic vibration apparatus as claimed in claim 1, characterized in that the swing lever (13 to 13,4) is supported in a torsional rubber element, which has its inner ring rigidly connected to the pivot (12) and its outer ring to the swing lever (13 to 13,4).

21. A domestic vibration apparatus as claimed in claim 1, characterized in that the swing-lever fulcrum **(12*a*,5) of the swing lever (13,5) takes the form of a diagonal-link hinge (35) made of a plastic, having link ends (38*b*) which act upon the swing lever (13,5) and having other link ends (38*a*) which act upon with a swing-lever pivot (12,5)**.

22. A domestic vibration apparatus as claimed in claim 21, characterized in that the swing-lever fulcrum **(12*a*,7), which takes the form of a diagonal-link hinge (35), is arranged on a bridge (49) by means of a plug-in mount (48), which bridge is laterally supported on the mounting plate (3,7)** (FIG. 7).

23. A domestic vibration apparatus as claimed in claim 21, characterized in that the first lever arm (14,5) forms a first side of a triangle, trapezium or trapezoid, the swing-lever fulcrum **(12*a*,5), which takes the form of a diagonal-link hinge (35), being situated in the area where the first and the second side (14,5; 14,5*a*), which form an angle with one another, diverge and in that the spring (23*b*) acts from the exterior on the second side (14,5*a*)**.

24. A domestic vibration apparatus as claimed in claim 1, characterized in that the spring (23) has a progressive characteristic and is made of a metal, plastic or rubber.

25. A domestic vibration apparatus as claimed in claim 1, characterized in that the single-phase synchronous motor (4) is energized with a direct voltage and utilizes electronic or mechanical commutation means.

26. A domestic vibration apparatus as claimed in claim 25, characterized in that the single-phase synchronous motor is energized with voltage pulses of only one polarity.

27. A domestic vibration apparatus as claimed in claim 25 or 26, characterized in that the frequency of the voltage pulses is 100 Hz or 120 Hz.

28. A domestic vibration apparatus as claimed in claim 27, characterized in that the pulse frequency is higher than 120 Hz, for example 360 Hz.

29. A domestic vibration apparatus as claimed in claim 28, characterized in that the coils are driven with a full-wave-rectified alternating voltage.

30. A domestic vibration apparatus as claimed in claim 1 characterized in that the rotor is at least partly encapsulated in a plastic, the crank pin being molded on.

31. A domestic vibration apparatus as claimed in claim 3, characterized in that a tangent line **(107*a*) to a circular arc of movement (106) described by the connecting-rod joint (16) about the swing-lever fulcrum (12*a*) during the vibratory movement, extends to the rotor shaft (10)** (FIG. 1*a*).

32. A domestic vibration apparatus as claimed in claim 3, characterized in that the sum of the length of the connecting rod (17) and the distance between the crank pin **(18*a*) and the axis of the rotor shaft (10) is equal to the length of the first lever arm (14), and for the maximum excursion the connecting line (24*b*) between the swing-lever fulcrum (12*a*) and the connecting-rod joint (16) and the aligned connecting lines (24, 24*a*) between the connecting-rod joint (16) and the crank pin (18*a*) and between the crank pin (18*a*) and the axis of the rotor shaft (10)**, form a right angle.

33. A domestic vibration apparatus as claimed in claim 1, wherein said domestic vibration apparatus is a dry shaver.

34. A domestic vibration apparatus as claimed in claim 1, wherein said domestic vibration apparatus is a hair trimmer.

35. A domestic vibration apparatus as claimed in claim 10, wherein said domestic vibration apparatus is a dry shaver.

36. A domestic vibration apparatus as claimed in claim 10, wherein said domestic vibration apparatus is a hair trimmer.

37. A domestic vibration apparatus as claimed in claim 12, wherein said domestic vibration apparatus is a dry shaver.

38. A domestic vibration apparatus as claimed in claim 12, wherein said domestic vibration apparatus is a hair trimmer.

39. A domestic vibration apparatus as claimed in claim 17, wherein said domestic vibration apparatus is a dry shaver.

40. A domestic vibration apparatus as claimed in claim 17, wherein said domestic vibration apparatus is a hair trimmer.

* * * * *